Oct. 29, 1963

M. PUTZER ET AL 3,109,129

MONITOR CIRCUIT FOR DETECTING FAILURES IN
A DATA TRANSMISSION SYSTEM

Filed April 17, 1959

INVENTORS
MURRAY PUTZER
FREDERICK B. SYLVANDER
ROBERT J. MOLNAR

BY Hubert L. Davis

ATTORNEY

INVENTORS
MURRAY PUTZER
FREDERICK B. SYLVANDER
ROBERT J. MOLNAR
BY Herbert L. Davis
ATTORNEY

United States Patent Office 3,109,129
Patented Oct. 29, 1963

3,109,129
MONITOR CIRCUIT FOR DETECTING FAILURES IN A DATA TRANSMISSION SYSTEM
Murray Putzer, Paterson, and Frederick B. Sylvander, Hackensack, N.J., and Robert J. Molnar, New York, N.Y., assignors to The Bendix Corporation, a corporation of Delaware
Filed Apr. 17, 1959, Ser. No. 807,064
10 Claims. (Cl. 318—29)

The invention relates to an improved monitor means for detecting various type failures in a data transmission system or systems and more particularly to a monitoring warning device for use with certain types of data transmitting systems utilizing various type synchros, including dual type data transmission systems applicable to roll and pitch servomechanisms of remote attitude indicators or aircraft instruments.

The invention is particularly adapted for use with an A.C. Data Transmission System of the type disclosed and claimed in copending U.S. application Serial No. 796,133, filed February 27, 1959, by Paul F. Bechberger, now U.S. Patent No. 3,038,150, granted June 5, 1962, and U.S. application Serial No. 796,421, filed March 2, 1959, by Frederick B. Sylvander, now U.S. Patent No. 3,038,149, granted June 5, 1962, both patents being assigned to The Bendix Corporation. Such systems may include back-to-back connected synchros and may broadly be applied to a variable induction type transformer system including A.C. transmitter and receiver devices or control transformers, wherein the transmitter and receiver devices are of a conventional type in which three output terminals of each transmitter are connected to three input terminals of a remotely located receiver, and provided furthermore that the function of the system will not be substantially deteriorated by the application of a small D.C. current to the windings of these A.C. devices. In the present invention two similar or normally identical back-to-back data systems may be utilized i.e., the pitch and roll servo systems of a remote horizon indicator, together with a novel arrangement of the two systems in relation to fault sensing D.C. bridges and fault sensing relay mechanisms.

A basic danger in the use of such three wire data transmission systems is that a breakage of one of the three interconnecting wires will in effect result in the transmission of incorrect data. However, in such case while electrical power or error signals may then still be transmitted to the receiver, it is difficult to notice any difference in the operation of the system under such faulty conditions from that under normal operating conditions.

An object of the invention is to provide novel means for providing a warning signal in the event of such a fault in the operating lines between the data transmitting device and the receiving device.

Another object of the invention is to provide a novel fault warning system in which there is provided in one of the three interconnecting leads between the transmitting and receiving synchros of each of the data transmitting systems a capacitor, while opposite sides of such capacitor are connected into a D.C. resistance bridge circuit so as to provide an arm of the bridge circuit controlling in turn output lines leading to some type of warning device, such as a warning flag, light, bell or other suitable warning means rendered effective upon a fault arising in the synchro windings or interconnecting leads, and in which arrangement because of the low D.C. resistance of the interconnected windings of the respective synchros there have been inserted in the two other leads between the transmitting and receiving synchros a like capacitor shunted by a resistor element of a value such that the three interconnecting leads are electrically balanced during normal operation, but in which arrangement the resistor elements are effective upon either of the leads opening or the interconnected synchro windings becoming open to cause the bridge to become unbalanced so as to trigger the operation of the warning device.

Another object of the invention is to provide novel means to detect failures in the excitation voltages induced in the interconnected windings of the synchro transmitter and effective to trigger operation of suitable warning means.

Another object of the invention is to provide means effective at any angular position of the rotor element of the synchro transmitter to render operative a suitable warning means upon the excitation voltage decreasing below a predetermined minimum value.

In monitoring the excitation voltage, the magnitude of the voltages between any two leads of the three wire output leads from the synchro transmitter and the third output lead varies sinusoidally with the angular position of the rotor element of the synchro and these functions are one hundred and twenty degrees (120°) apart. By rectifying the voltage applied between the two leads and the third lead and connecting the two output leads in parallel across a filter condenser connected between the third lead and said parallel connection, the D.C. voltage across the condenser will vary from some maximum value K to a predetermined minimum value .5K depending upon the position of the rotor. However, a failure in such excitation voltage would reduce the voltages between the corresponding output leads to zero and the D.C. voltage across the filter condenser would drop to zero. An object of the invention, therefore, is to provide suitable means for detecting a drop in voltage across the filter condenser upon a failure in the excitation voltage for operating a suitable fault warning device.

Another object of the invention is to provide means whereby a rotor winding of the receiver synchro may be made part of a D.C. bridge and any significant change in the resistance of the rotor winding will unbalance a bridge circuit and trigger operation of a suitable warning device.

A further object of the invention is to provide a means whereby the input to an amplifier for the data transmission system may be monitored so that in the event of failure in either the servoamplifier, motor or gear train driven thereby the input signal will not null properly whereupon the input signal remains high for an excessive period of time so that such signal voltage is effective to trigger operation of a suitable warning device.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
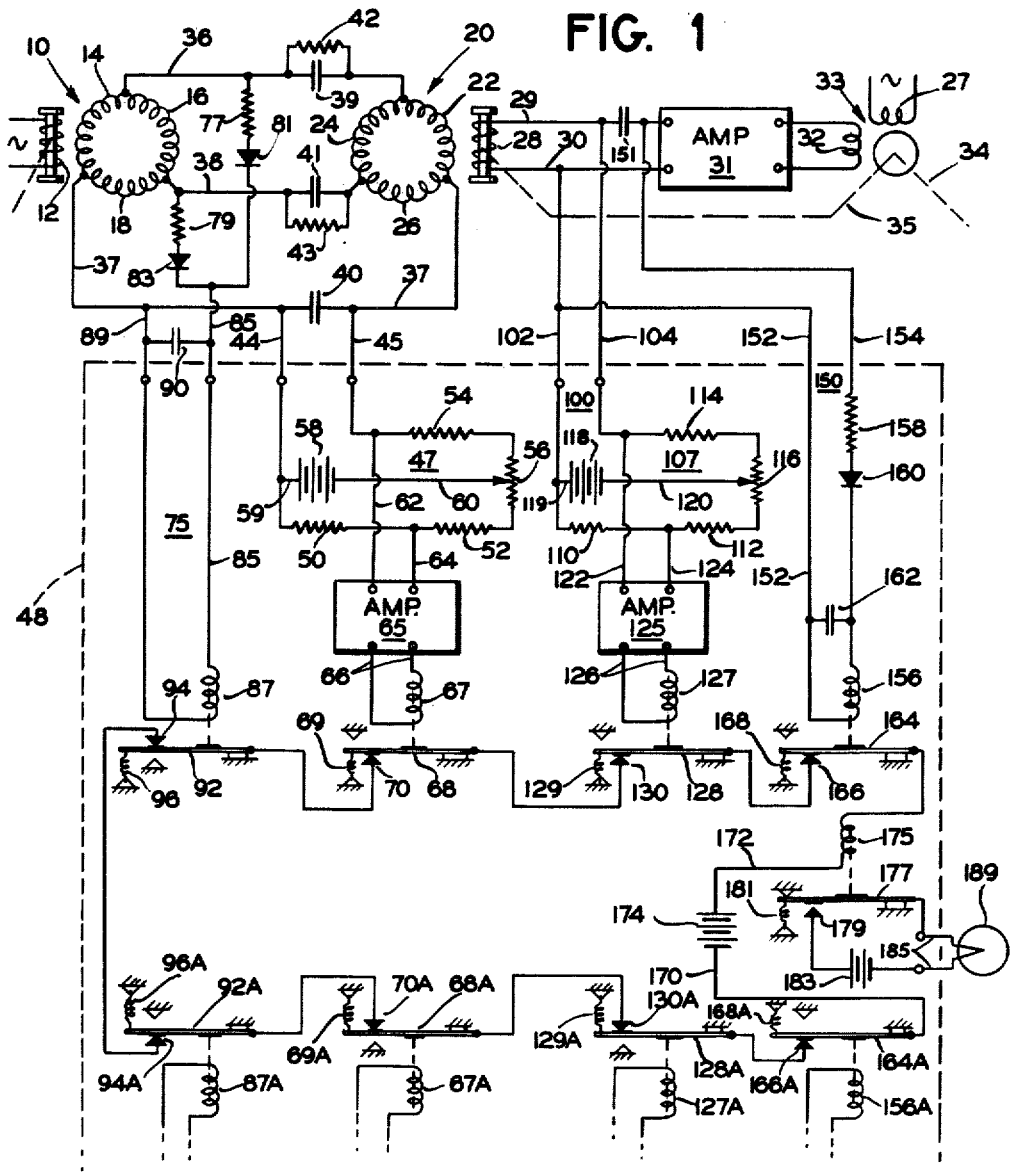
FIGURE 1 is a schematic wiring diagram of a data transmission system including a monitor system embodying the present invention.

Referring to the drawing of FIGURE 1 there is indicated generally by the number 10 a transmitter synchro or rotary induction transformer having a rotary winding 12 connected across a suitable source of alternating current and inductively coupled to stator windings 14, 16 and 18. There is further indicated by a numeral 20 a synchro receiver unit or rotary induction transformer having stator windings 22, 24 and 26 and a rotor winding 28 inductively coupled to the stator windings 22, 24 and 26. Conductors 29 and 30 lead from the winding 28 so as to apply an output signal through amplifier 31 to a control winding 32 of a two-phase servomotor 33 of conventional type having a fixed phase winding 27. The motor 33 is operatively connected through a follow-up shaft 35 to the rotor of the synchro 20 and has an output shaft 34. The position of the rotor winding 28 is adjusted through the shaft 35 so as to follow the adjusted position of the winding 12 of the transmitter synchro 10 in a conventional manner.

As shown the stator winding 14 is connected by conductors 36 and 37 to the stator winding 22 of the receiver synchro 20, while the stator winding 16 of the transmitter synchro 10 is connected by conductors 36 and 38 to the stator winding 24 of the receiver synchro 20. The stator winding 18 of the transmitter synchro 10 is connected by the conductors 37 and 38 to the stator winding 26 of the receiver synchro 20.

In the conductors 36, 37 and 38 are provided the capacitors 39, 40 and 41. Shunted across the capacitors 39 and 41 are resistors 42 and 43, respectively, while at opposite sides of the capacitor 40 are connected conductors 44 and 45 which lead into a Wheatstone bridge circuit 47, in a monitor system indicated generally by the numeral 48.

As shown in FIGURE 1, there is provided as opposite arms of the bridge circuit resistors 50, 52 and 54, together with a variable calibrating resistor 56. There is applied across the bridge 47 a battery or other D.C. voltage source 58 connected across input lines 59 and 60 of the bridge circuit 47.

The output of the bridge circuit 47 is connected through conductors 62 and 64 to an input of an amplifier 65 having output lines 66 leading to an electromagnetic control winding 67 operating a relay switch 68 biased by a spring 69 into contacting relation with a switch contact 70 for controlling operation of a suitable warning device, as hereinafter explained.

In the aforenoted arrangement, it will be seen that the bridge 47 may be readily adjusted by the calibrating resistor 56 to a balanced relation relative to the resistance of the windings 14, 16 and 18 of the synchro 10 and the windings 22, 24 and 26 of the synchro 20, together with the interconnecting leads 36, 37 and 38 and resistances 42 and 43 which are connected by the lines 44 and 45 into the bridge 47 so as to provide an arm of the bridge 47. Thus, upon an opening or fault in the interconnected leads or synchro windings there will be produced a change in the resistance of the bridge arm including synchros 10 and 20 causing the bridge 47 to become unbalanced, whereupon an output voltage is applied across the lines 62—64 which may be amplified through the amplifier 65 so as to operate the warning device to warn the operator of the faulty condition.

The arrangement is such that the capacitors 39, 40 and 41 are of a like capacity and the resistor elements 42 and 43 shunted, respectively, across the capacitors 39 and 41 are each of a value equal to the effective resistance of the Wheatstone bridge 47 applied across the capacitor 40 so that the effective resistance of the three interconnecting conductors 36, 37 and 38 is substantially the same during normal operation.

Furthermore, the D.C. resistance of the stator windings 14, 16 and 18 of the synchro 10 and the D.C. resistance of the stator windings 22, 24 and 26 of the synchro 20 may be considered negligible as compared to the resistance of the resistor elements 42, 43 and the bridge 47 so that the stator leads may be considered connected to a common point in so far as the condition sensing direct current may be effected thereby. Thus, the D.C. resistance across the capacitors 39 and 41 will be the value of the resistor elements 42 and 43 connected in parallel or, since the resistors are equal, one half the value of one resistor.

From the foregoing, it will be seen that if either one of the conductors 36 or 38 were to open then the effective D.C. resistance would increase to twice the normal value and the bridge 47 would no longer be effectively balanced. Thus, because of the low D.C. resistance of the aforesaid stator windings, the provision of the resistor elements 42 and 43 provides in the interconnecting leads additional D.C. resistance so that a measurable amount of voltage will result across the output of the bridge 47 from a failure in one or the other of the stator windings for triggering operation of the warning device to warn the operator of the faulty condition as hereinafter explained.

*Monitor System for Excitation Voltage*

In order to effectively detect failures in the excitation voltages or rotor of the transmitter synchro 10, there is further provided in the monitor system 48 a monitor circuit 75, including resistors 77 and 79 leading from the output conductors 36 and 38, respectively, through diodes 81 and 83 to a conductor 85 and through an electromagnetic winding 87 and conductor 89 to the third output conductor 37. A capacitor 90 is connected across the electromagnetic winding 87.

Figure 2:
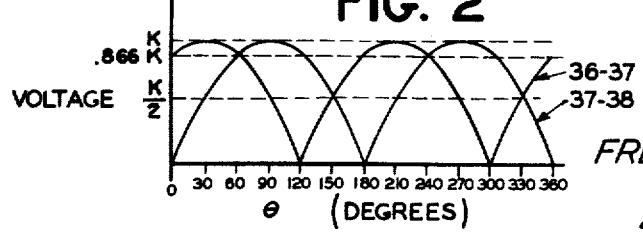
FIGURE 2 is a graphical illustration showing the minimum and maximum voltages effective in monitoring the excitation voltages for the synchro transmitter during normal operation.

The arrangement is such that with the absolute value of the signal voltages between the leads 36 to 37 and 37 to 38 plotted as a function of $\theta$, the angular position of the rotor winding 12 of the transmitter synchro 10, is shown in FIGURE 2.

It will be seen from the graphical illustration of FIGURE 2 that for any value of $\theta$ the minimum value of the voltage across the lines 36 to 37 or 37 to 38 is .5K. Therefore, if the control transformer or signal transmitting synchro 10 is properly excited a minimum D.C. voltage will exist across the capacitor 90. In the event of a failure of the excitation voltage, the D.C. voltage across the capacitor 90 will decay to zero and the electromagnetic winding 87 will be effectively deenergized. The electromagnetic winding 87 biases a relay switch 92 into contacting relation with a switch contact 94 so that upon deenergization of the winding 87 the switch contact 94 is biased by a spring 96 into an open contact relation for controlling operation of a suitable warning device, as hereinafter explained.

*Monitor System for Rotor Winding of Synchro Receiver*

Further in order to effectively detect a failure in the rotor winding 28 of the signal receiving synchro 20, there is provided in the monitor system 48 a monitor circuit 100, in which conductors 102 and 104 lead from opposite sides of the rotor winding 28 into a Wheatstone bridge circuit 107, including as opposite arms of the bridge circuit resistors 110, 112 and 114, together with a variable calibrating resistor 116 and a battery or other D.C. voltage source 118 connected across input lines 119 and 120 of the bridge circuit 107.

The output of the bridge circuit 107 is connected through conductors 122 and 124 to an input of an amplifier 125 having output lines 126 leading to an electromagnetic control winding 127 operating a relay switch 128 biased by a spring 129 into contacting relation with a switch contact 130 for controlling operation of a suitable warning device, as hereinafter explained.

In the aforenoted arrangement, it will be seen that the bridge 107 may be readily adjusted by the calibrating resistor 116 to a balanced relation relative to the resistance of the rotor winding 28 of the signal receiving synchro 20 which is connected by the lines 102 and 104 into the bridge 107 so as to provide an arm of the bridge 107. Thus, upon an opening or shorting of the winding 28, there will be produced a change in the resistance of such arm of the bridge 107 causing the bridge 107 to become unbalanced, whereupon an output voltage is applied across the lines 122 and 124 which may be amplified through the amplifier 125 so as to operate the warning device to warn the operator of the faulty condition, as hereinafter explained.

*Monitor System for Amplifier, Motor and Gear Train*

There is further provided in the monitor system 48 a monitoring circuit 150 for detecting a failure in the operation of the amplifier 31, motor 33 or gear train 35. In the output conductor 29 leading from the rotor winding 28 there is provided a capacitor 151 connected at one side of an output from the winding 28 and at an opposite side to an input to the amplifier 31.

Connected across the input to the amplifier 31 are conductors 152 and 154 leading to an electromagnetic winding 156. The conductor 154 leads through a resistor 158 and diode 160 to the winding 156. Across the winding 156 is connected a capacitor 162.

Furthermore, in the operation of the system, a failure in the amplifier 31, motor 33 or gear train 35 will tend to prevent the rotor winding 28 from being adjusted promptly to a position such as to nullify the signal voltage applied across the input to the amplifier 31. Upon such input signal voltage continuing to remain at a sufficient value and for an excessive interval of time, determined by the resistor 158 and capacitor 162 combination, a resulting energization of the electromagnetic winding 156 is effective to bias a relay switch 164 out of contacting relation with a switch contact 166 for controlling operation of a suitable warning device, as hereinafter explained. The relay switch 164 is normally biased by a spring 168 into contacting relation with the switch contact 166, as shown in FIGURE 1.

*Operation of Warning Device*

Further, as shown in FIGURE 1, the relay switches 92, 68, 128 and 164 are normally biased so as to close cooperating switch contacts 94, 70, 130 and 166, respectively, for connecting through conductors 170 and 172 a battery or other source of electrical energy 174 across an electromagnetic relay winding 175 to effectively energize the same so as to maintain a relay switch 177 out of contacting relation with a contact 179. Upon deenergization of the winding 175, as upon any one of the relay switches 92, 68, 128 or 164 opening the switch contact controlled thereby, the relay switch 177 is biased by a spring 181 to a position closing the contact 179 for connecting a source of electrical energy 183 across output lines 185 so as to effect energization of a suitable warning device such as an electric lamp 189, as shown in FIGURE 1, or other suitable warning device such as shown in FIGURE 3.

Figure 3:
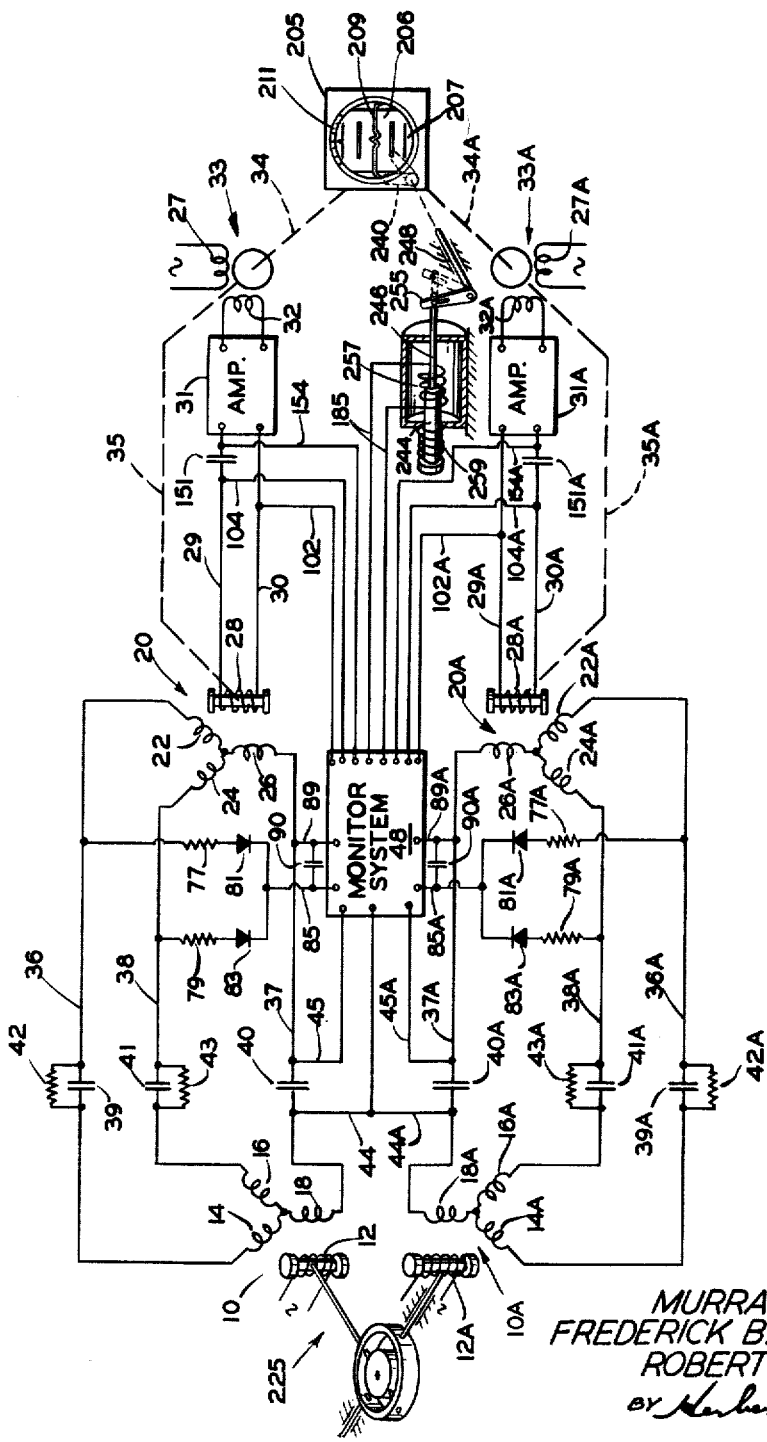
FIGURE 3 is a schematic wiring diagram of a dual data transmission system including a monitor system in which the present invention is designed for use and shown as applied, for example, to a remote attitude indicating system.

There may be further connected in serial relation to the relay switches 92, 68, 128 and 164 like relay switches bearing corresponding numerals with the suffix A, including relay switches 92A, 68A, 128A and 164A, controlled in a like manner by the electromagnetic windings 87A, 67A, 127A and 156A to monitor a second data transmission system, such as shown in FIGURE 3, in a similar manner so as to cause the fault warning device to give a suitable indication upon a fault in the operation thereof arising in the second data transmission, as heretofore explained, with regard to the first mentioned data transmission system.

*Dual Data Transmission System*

As shown in FIGURE 3, the invention is applied to a remote attitude indicating system in which such dual data transmission systems are adapted for use with a remote attitude indicator of a type having a housing 205 and a calibrated face of a movable tape 206 mounted in a frame plate 207 operable by suitable mechanism in the housing 205. Such operating mechanism, not shown, is effective to rotate the tape 206 within the frame plate 207 up or down relative to an horizon bar 209 to indicate the pitch of the craft and to rotate the frame plate 207 clockwise or counterclockwise relative to suitable indicating means 211 on the face of the housing to indicate the roll attitude of the craft. Thus, the attitude of the aircraft embodying the instrument is realistically presented to the pilot.

The mechanism to effect the aforenoted operation of the tape 6 and frame plate 7 may be of a conventional type or the pitch and roll indicator mechanism may be of a type such as disclosed and claimed in copending application Serial No. 536,915, filed September 27, 1955, by Charles E. Hurlburt and assigned to Bendix Aviation Corporation.

As is well known in the art, the operating mechanism for the remote pitch and roll indicator may include separate synchro drive motors 33 and 33A, shown schematically in the drawing of FIGURE 3, and in which the motor 33 serves as a pitch input servo and motor 33A serves as a roll input servo.

The pitch input motor 33, is controlled through a data transmission system such as heretofore described with reference to FIGURE 1, including an amplifier 31 of conventional type, a receiver synchro 20, and a transmitter synchro 10 responsive to the pitch attitude of an aircraft as sensed by a remotely located vertical gyro 225 of conventional type. The synchro 10 has a rotor element and winding 12 associated with the pitch axis of the gyro 25 and arranged in conventional manner to provide a signal through the amplifier 31 to the control winding 32 of the servomotor 33 which, in turn, gives an appropriate adjustment to the rotor and rotor winding 28 of the receiver synchro 20 and the tape 6 of the indicator mechanism so as to indicate the pitch attitude of the aircraft.

The roll input servomotor 33A is operatively controlled through a data transmission system such as heretofore described with reference to FIGURE 1 in which corresponding parts are indicated in FIGURE 3 by like numerals with the suffix A and including an amplifier 31A of conventional type, a receiver synchro 20A and transmitter synchro 10A. The synchro 10A has a rotor element and winding 12A associated with the bank or roll axis of the remotely located vertical gyro 225 so as to provide a signal through the amplifier 31A to the control winding 32A of the roll input servomotor 33A which, in turn, gives an appropriate adjustment to the rotor and rotor winding 28A of the receiver synchro 20A and the frame plate 207 of the indicator mechanism 205 so as to indicate the roll attitude. Thus, the servomotors 33 and 33A appropriately adjust the tape 206 and the frame plate 207 so as to indicate the pitch and roll attitude of the aircraft as sensed by the remotely located vertical gyro 225.

Upon a fault in any of the operating conditions, as heretofore described with reference to FIGURE 1, in the data transmission systems interconnecting the transmitter device 10 with the receiver device 20 and the transmitter device 10A with the receiver device 20A, such faulty condition of operation is immediately brought to the attention of the operator of the craft, through operation of a suitable signal device, as hereinafter described.

Thus, the operating conditions that are monitored include the following:

(*a*) Excitation voltage and transmitter rotor winding.
(*b*) Synchro stator windings and interconnecting leads.
(*c*) Synchro receiver rotor winding.
(*d*) Servoamplifier, motor and follow-up gear train to drive synchro receiver rotor.

The visual indication of a faulty operation in any of such conditions of either system is a small metal flag 240 as illustrated in FIGURE 3 and operated by the herein provided control mechanism so as to be visible on the face of the remote attitude indicator under such faulty condition of operation. When the unit is operating properly and there is no failure in the operative conditions aforenoted, the flag 240 is normally retracted by operation of the control mechanism to a position, indicated in the drawing by dotted lines, behind a portion of the surrounding rim of the dial so as to be visually ineffective.

The positioning of the flag 240 is effected through an armature 244 and actuating rod 246 operably connected to a shaft 248, as shown schematically in the drawing of FIGURE 3. The shaft 248 is rotatably mounted in bearings in the housing 5 and operated through a linkage 255 upon energization of an electromagnetic winding 257 cooperating with the armature 244 so as to effect movement of the flag 240 from the retracted dotted line position behind the edge of dial, as shown in the drawing of FIGURE 3, to an effective visual position also indicated in the drawing by dotted lines. Upon deenergization of the winding 257, a spring 259, shown schematically, is effective to return the flag 240 to the retracted position.

Excitation of the winding 257 of the electromagnetic actuator is provided through output lines 185 controlled by relay switch 177 as heretofore described with reference to FIGURE 1 and as shown in the drawing of FIGURE 3 corresponding parts to those shown and explained with reference to FIGURE 1 are indicated by like numerals while those corresponding parts in the second data transmission system are indicated by like numerals with the suffix A.

More specifically in the data transmission system of FIGURE 3, transmitter synchro or rotary induction transformer 10 has a rotor winding 12 connected across a suitable source of alternating current and inductively coupled to stator windings 14, 16, and 18. Further, the receiver synchro or rotary induction transformer 20 has stator windings 22, 24 and 26 and a rotary winding 28 inductively coupled to the stator windings 22, 24 and 26. Conductors 29 and 30 lead from the winding 28 so as to apply an output signal through amplifier 31 to a control winding 32 of a two-phase servomotor 33 of conventional type having a fixed phase winding 27. The motor 33 is operatively connected through a follow-up shaft 35 to the rotor of the synchro 20. The position of the rotor winding 28 is adjusted thereby so as to follow the adjusted position of the winding 12 of the transmitter synchro 10 in a conventional manner, while a corresponding movement is imparted to an output shaft 34 to adjust the tape 206 to indicate the pitch of the aircraft, as heretofore described.

As shown, the stator winding 14 is operably connected by conductor 36 through capacitor 39 and resistor 42 to the stator winding 22 of the receiver synchro 20, while the stator winding 16 of the transmitter synchro 10 is operably connected by conductor 38 through capacitor 41 and resistor 43 to the stator winding 24 of the receiver synchro 20. The stator winding 18 of the transmitter synchro 10 is operably connected by the conductor 37 through capacitor 40 to the stator winding 26 of the receiver synchro 20.

Similarly in the second data transmission system the rotor element of the transmitter synchro or rotary induction transformer 10A has a rotor winding 12A connected across a suitable source of alternating current and inductively coupled to stator windings 14A, 16A and 18A. Further, the receiver synchro or rotary induction transformer 20A has stator windings 22A, 24A and 26A and a rotor winding 28A inductively coupled to the stator windings 22A, 24A and 26A. Conductors 29A and 30A lead from the winding 28A so as to apply an output signal through amplifier 31A to a control winding 32A of a two-phase servomotor 33A of conventional type having a fixed phase winding 27A. The motor 33A is operatively connected through a follow-up shaft 35A to the rotor of the synchro 20. The position of the rotor winding 28A is adjusted thereby so as to follow the adjusted position of the winding 12A of the transmitter synchro 10A in a conventional manner, while a corresponding movement is imparted to an output shaft 34A to adjust the frame plate 207 to indicate the roll attitude of the aircraft as heretofore described.

As shown, the stator winding 14A is operably connected by conductor 36A through capacitor 39A and resistor 42A to the stator winding 22A of the receiver synchro 20A, while the stator winding 16A of the transmitter synchro 10A is operably connected by conductor 38A through capacitor 41A and resistor 43A to the stator winding 24A of the receiver synchro 20A. The stator winding 18A of the transmitter synchro 10A is operably connected by a conductor 37A through capacitor 40A to the stator winding 26A of the receiver synchro 20A.

The monitor system 48 cooperates with both of the dual data transmission systems to effect operation of the flag 240 by the actuator mechanism 244 to 257 so as to warn in a fail safe manner, as heretofore described with reference to FIGURE 1, of a fault in either system which may cause an indication of a condition different from that being transmitted through the data transmitter by the condition sensor, for example, the altitude gyro 225 of FIGURE 3.

The warning flag 240 may be of a type described in Konet et al. U.S. Patent No. 2,664,558, granted December 29, 1955, and assigned to Bendix Aviation Corporation. During normal operation of the system the flag 240 may be biased by the spring 259 in a counterclockwise direction to a position at which the flag 240 is hidden from the view of the operator. However, upon a faulty operation of the data transmission system, as heretofore described, the output signal from the monitor system 48 and applied across the lines 185 is sufficient to cause the mechanism 244 to 257 to actuate the flag 240 in a clockwise direction to a position in which the flag 240 is visible to the operator so as to indicate a faulty condition.

Although two embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a system of the type including a signal transmitting variable coupling transformer, a signal receiving variable coupling transformer, and three electrical conductors to operatively connect the signal transmitting transformer to the signal receiving transformer; the improvement comprising three capacitors, one of said capacitors being connected in each of said electrical conductors, a first resistor element to shunt one of said capacitors, a second resistor element to shunt a second of said capacitors, a normally balanced Wheatstone bridge having an electrical input and an electrical output, a direct current source of electrical energy operably connected to said input, other electrical conductors leading from opposite sides of a third of said capacitors to electrically connect that part of the system including the first-mentioned three electrical conductors and the first and second resistor elements into a control arm of the normally balanced bridge, and control means operatively connected to the electrical output of said normally balanced electrical bridge, said control means being rendered operative upon a substantial change in the electrical resistance of that part of the system electrically connected in said control arm and effective to electrically unbalance said bridge.

2. In a data transmission system of a type including an alternating current signal transmitting device and an alternating current signal receiving device, each device including inductive windings, and several electrical conductors to operatively connect said inductive windings of the transmitting device to said inductive windings of the receiving device for transmitting said signal from the transmitting device to the receiving device; the improvement comprising a plurality of capacitors, one of said capacitors being connected in each of said electrical conductors, a first resistor element to shunt one of said capacitors, a second resistor element to shunt a second of said capacitors, a normally balanced electrical network having an electrical input and an electrical output, a source of electrical energy having a current characteristic different from said signal and operably connected to said input, other electrical conductors leading from opposite sides of a third of said capacitors to electrically connect a part of the data transmission system including said first and second resistor elements into the normally balanced electrical network, and control means operatively connected to the electrical output of said normally balanced electrical network, said control means being rendered operative when a fault in said part causes a substantial change in the electrical resistance of that part of the data transmission system electrically connected in said network.

3. In a data transmission system of a type including an alternating current signal transmitting device and an alternating current signal receiving device, each device including inductive windings, and several electrical conductors to operatively connect said inductive windings of the transmitting device to said inductive windings of the receiving device for transmitting said signal from the transmitting device to the receiving device; the improvement comprising three capacitors of equal electrical capacitance, one of said capacitors being connected in each of said electrical conductors, a first resistor element to shunt one of said capacitors, a second resistor element to shunt a second of said capacitors, said first and second resistor elements having equal electrical resistance values, a normally balanced electrical network having an electrical input and an electrical output, a direct current source of electrical energy operably connected to said input, other electrical conductors leading from opposite sides of a third of said capacitors to electrically connect a part of the data transmission system into the normally balanced electrical network, said part including said first and second resistor elements of said electrical conductors, and fault warning means connected to the electrical output of said normally balanced electrical network to be rendered operative upon the electrical output becoming effective by an unbalancing of the network due to a discontinuity arising in that part of the data transmission system electrically connected in said normally balanced electrical network.

4. In a data transmission system of a type including an alternating current signal transmitting device and an alternating current signal receiving device, each device including a variable induction transformer having several windings electrically connected and variably inductively coupled to another winding, and several electrical conductors to operatively connect said several inductive windings of the transmitting device to said several inductive windings of the receiving device for transmitting said signal from the transmitting device to the receiving device; the improvement comprising a plurality of capacitors, one of said capacitors connected in each of said electrical conductors, a normally electrically balanced Wheatstone bridge having an electrical input and an electrical output, a direct current source of electrical energy operably connected to said input, other electrical conductors leading from opposite sides of one of said capacitors, resistor elements to shunt the other of said capacitors, said other conductors to electrically connect a part of the data transmission system into an arm of the normally electrically balanced Wheatstone bridge, said part including said several inductive windings of each of said devices and said several electrical conductors including said resistor elements for transmitting said signal from the transmitting device to the receiving device, and fault warning means connected to the electrical output of said normally electrically balanced Wheatstone bridge, said fault warning means being rendered operative upon an unbalancing of the bridge due to a fault in that part of the data transmission system electrically connected in said normally balanced bridge.

5. In a data transmission system of a type including an alternating current signal transmitting device and an alternating current signal receiving device, the signal transmitting device including a variable induction transformer having several windings electrically connected and an A.C. excited winding variably inductively coupled thereto, and three electrical conductors to operatively connect said several windings of the transmitting device to the signal receiving device for transmitting said signal from the transmitting device to the receiving device; the improvement comprising first fault detecting means including three capacitors, one of said capacitors being connected in each of said electrical conductors, a first resistor element to shunt one of said capacitors, a second resistor element to shunt a second of said capacitors, a normally balanced Wheatstone bridge having an electrical input and an electrical output, a direct current source of electrical energy operably connected to said input, other electrical conductors leading from opposite sides of a third of said capacitors to electrically connect that part of the system including the first-mentioned three electrical conductors and the first and second resistor elements into a control arm of the normally balanced bridge, and control means operatively connected to the electrical output of said normally balanced electrical bridge, said control means being rendered operative upon a substantial change in the electrical resistance of that part of the system electrically connected in said control arm and effective to electrically unbalance said bridge, second fault detecting means for detecting a failure in the excitation of the inductively coupled winding, said detecting means including rectifier means leading from two of said three electrical conductors, an electromagnetic winding operably connected between said rectifying means and the third of said electrical conductors, and a capacitor connected across said electromagnetic winding so that under normal excitation of the inductively coupled winding a D.C. voltage of at least a predetermined minimum value will be applied through said rectifier means and across the last mentioned capacitor to effectively energize the electromagnetic winding and upon a failure in the excitation of the inductively coupled winding the D.C. voltage applied across the capacitor will decrease below the predetermined minimum value so as to effectively deenergize the electromagnetic winding, second control means operated by said electromagnetic winding and rendered operative upon such a failure in the excitation of the inductively coupled winding, and fault warning means operatively connected to said first and second mentioned control means and rendered effective upon either of said control means being rendered operative as aforesaid.

6. In a data transmission system of a type including an alternating current signal transmitting device and an alternating current signal receiving device, the signal receiving device including a variable induction transformer having several windings electrically connected and a winding variably inductively coupled thereto, several electrical conductors to operatively connect said signal transmitting device to said several windings of the signal receiving device for transmitting said signal from the transmitting device to the receiving device, and output signal conductors leading from said inductively coupled winding; the improvement comprising a normally balanced electrical network having an electrical input and an electrical output, a source of electrical energy having a current characteristic different from said signal and operably connected to said input, other electrical conductors to connect said inductively coupled winding into the normally balanced electrical network, control means operatively connected to the electrical output of said normally balanced electrical network, and said control means being rendered operative when a fault in said last mentioned winding causes a substantial change in the electrical resistance thereof.

7. In a data transmission system of a type including an alternating current signal transmitting device and an alternating current signal receiving device, the signal receiving device including a variable induction transformer having several windings electrically connected and a winding variably inductively coupled thereto, several electrical conductors to operatively connect said signal transmitting device to said several windings of the signal receiving device for transmitting said signal from the transmitting device to the receiving device, a pair of output signal conductors leading from said inductively coupled winding, an amplifier having a pair of signal inputs, means operatively connecting said output signal conductors to the signal inputs of said amplifier, said amplifier having output signal conductors, a reversible motor controlled by the output signal applied through the output conductors from said amplifier, and means drivingly connecting said motor to said signal receiving device so as to vary the coupling relation between the inductive winding and the several windings of the signal receiving device toin response to said controlling signal in such a manner as to nullify the controlling signal; the improvement comprising said operative connecting means including a capacitor connected between one of said output signal conductors and one of the signal inputs of the amplifier, first fault detecting means including a normally balanced electrical network having an electrical input and an electrical output, a source of electrical energy having a current characteristic different from said signal and operably connected to said input, other electrical conductors to connect said inductively coupled winding into the normally balanced electrical network, control means operatively connected to the electrical output of said normally balanced electrical network, and said control means being rendered operative when a fault in said last mentioned winding causes a substantial change in the electrical resistance thereof, second fault detecting means including a resistor and rectifier, means connecting said resistor and rectifier across the signal inputs to said amplifier, said connecting means including an electromagnetic winding, and a capacitor connected across said electromagnetic winding so that upon the input signal to the amplifier continuing for an excessive interval of time the electromagnetic winding is effectively energized, and control means actuated by said electromagnetic winding and rendered operative upon such effective energization of the electromagnetic winding; and fault warning means operatively connected to the respective control means of said first and second fault detecting means and rendered effective upon one of said control means being rendered operative as aforesaid.

8. In a data transmission system of a type including an alternating current signal transmitting device and an alternating current signal receiving device, the signal transmitting device including a variable induction transformer having three windings electrically connected and an A.C. excited winding variably inductively coupled thereto, and the signal receiving device including a variable induction transformer having three windings electrically connected and a winding variably inductively coupled thereto, three electrical conductors to operatively connect said three windings of the signal transmitting device to said three windings of the signal receiving device, a pair of output signal conductors leading from said inductively coupled winding of said signal receiving device, an amplifier having a pair of signal inputs, means operatively connecting said output signal conductors to the signal inputs of said amplifier, said amplifier having output signal conductors, a reversible motor controlled by the output signal applied through the output conductors from said amplifier, and means drivingly connecting said motor to said signal receiving device so as to vary the coupling relation between the inductive winding and the several windings of the signal receiving device in response to said controlling signal in such a manner as to nullify the controlling signal; the improvement comprising said operative connecting means including a capacitor connected between one of said output signal conductors and one of the signal inputs to the amplifier, first fault detecting means including three capacitors, one of said capacitors being connected in each of said three electrical conductors, a first resistor element to shunt one of said capacitors, a second resistor element to shunt a second of said capacitors, a normally balanced Wheatstone bridge having an electrical input and an electrical output, a direct current source of electrical energy operably connected to said input, other electrical conductors leading from opposite sides of a third of said capacitors to electrically connect that part of the system including the first-mentioned three electrical conductors and the first and second resistor elements into a control arm of the normally balanced bridge, and control means operatively connected to the electrical output of said normally balanced electrical bridge, said control means being rendered operative upon a substantial change in the electrical resistance of that part of the system electrically connected in said control arm and effective to electrically unbalance said bridge; second fault detecting means for detecting a failure in the excitation of the inductively coupled winding of the signal transmitting device, said detecting means including rectifier means leading from two of said three electrical conductors, an electromagnetic winding operably connected between said rectifying means and the third of said electrical conductors, and a capacitor connected across said electromagnetic winding so that under normal excitation of the inductively coupled winding a D.C. voltage of at least a predetermined minimum value will be applied through said rectifier means and across the last mentioned capacitor to effectively energize the electromagnetic winding and upon a failure in the excitation of the inductively coupled winding of the signal transmitting device the D.C. voltage applied across the capacitor will decrease below the predetermined minimum value so as to effectively deenergize the electromagnetic winding, and second control means operated by said electromagnetic winding and rendered operative upon such a failure in the excitation of the inductively coupled winding; a third fault detecting means including a normally balanced electrical network having an electrical input and an electrical output, a source of electrical energy having a current characteristic different from said signal and operably connected to said input, other electrical conductors to connect said inductively coupled winding of the signal receiving device into the normally balanced electrical network, control means operatively connected to the electrical output of said normally balanced electrical network, and said control means being rendered operative when a fault in said last mentioned inductively coupled winding causes a substantial change in the electrical resistance thereof; a fourth fault detecting means including a resistor and rectifier, means connecting said resistor and rectifier across the signal inputs to said amplifier, said connecting means including an electromagnetic winding, and a capacitor connected across said electromagnetic winding so that upon the input signal to the amplifier continuing for an excessive interval of time the electromagnetic winding is effectively energized, and control means actuated by said electromagnetic winding and rendered operative upon such effective energization of the electromagnetic winding; and fault warning means operatively connected to the respective control means of said first, second, third and fourth fault detecting means and rendered effective upon any one of said control means being rendered operative as aforesaid.

9. In a data transmission system of a type including an alternating current signal transmitting device and an alternating current signal receiving device, the signal receiving device including a variable induction transformer having several windings electrically connected and a winding variably inductively coupled thereto, several electrical conductors to operatively connect said signal transmitting device to said several windings of the signal receiving device for transmitting said signal from the transmitting device to the receiving device, a pair of output signal conductors leading from said inductively coupled winding, an amplifier having a pair of signal inputs, means operatively connecting said output signal conductors to the signal inputs of said amplifier, said amplifier having output signal conductors, a reversible motor controlled by the output signal applied through the output conductors from said amplifier, and means drivingly connecting said motor to said signal receiving device so as to vary the coupling relation between the inductive winding and the several windings of the signal receiving device in response to said controlling signal in such a manner as to nullify the controlling signal; the improvement comprising first fault detecting means operatively connected across said variably inductively coupled winding for detecting a fault in said variably inductively coupled winding, second fault detecting means operatively connected across the signal inputs of said amplifier for detecting a fault in the input signal to the amplifier, the means operatively connecting said output signal conductors to the signal inputs of said amplifier including capacitor means to electrically isolate the first and second fault detecting means, and fault warning means operatively controlled by said first and second mentioned detecting means and rendered operative upon such a fault arising.

10. In a data transmission system of a type including an alternating current signal transmitting device and an alternating current signal receiving device, the signal transmitting device including a variable induction transformer having several windings electrically connected and an A.C. excited winding variably inductively coupled thereto, the signal receiving device including a variable induction transformer having several windings electrically connected and a winding variably inductively coupled thereto, several electrical conductors to operatively connect said several windings of said signal transmitting device to said several windings of the signal receiving device for transmitting said signal from the transmitting device to the receiving device, a pair of output signal conductors leading from said inductively coupled winding of the signal receiving device, an amplifier having a pair of signal inputs, means operatively connecting said output signal conductors to the signal inputs of said amplifier, said amplifier having output signal conductors, a reversible motor controlled by the output signal applied through the output conductors from said amplifier, and means drivingly connecting said motor to said signal receiving device so as to vary the coupling relation between the signal receiving inductive winding and the several windings of the signal receiving device in response to said controlling signal in such a manner as to nullify the controlling signal; the improvement comprising first fault detecting means operatively connected across the electrically connected windings of the signal transmitting device for detecting a fault in the excitation of said A.C. excited winding of the alternating current signal transmitting device; second fault detecting means, capacitor means in one of the several electrical conductors operatively interconnecting said several windings of the transmitting device to said several windings of the receiving device, said capacitor means coupling the signal from said transmitting device to said receiving device, said second fault detecting means being operatively connected across said capacitor means for detecting a fault in said several windings of said devices and in the several electrical conductors operatively interconnecting said several windings of the transmitting device to said several windings of the receiving device, and said capacitor means electrically isolating said first and second fault detecting means; third fault detecting means operatively connected across said variably inductively coupled winding for detecting a fault in said variably inductively coupled winding of the receiving device; fourth fault detecting means operatively connected across the signal inputs of said amplifier for detecting a fault in the input signal to said amplifier, the means operatively connecting said output signal conductors to the signal inputs of said amplifier including other capacitor means to electrically isolate the third and fourth fault detecting means, and fault warning means operatively controlled by said first, second, third and fourth mentioned detecting means and rendered operative upon such a fault occurring.

References Cited in the file of this patent

UNITED STATES PATENTS

| | | |
|---|---|---|
| 1,713,202 | Warner | May 14, 1929 |
| 2,388,977 | Johnson | Nov. 13, 1945 |
| 2,576,574 | Cochran | Nov. 27, 1951 |
| 2,619,526 | Willman | Nov. 25, 1952 |
| 2,632,882 | Jupp | Mar. 24, 1953 |
| 2,634,404 | Carmichael | Apr. 7, 1953 |
| 2,736,009 | Barnickel | Feb. 21, 1956 |
| 2,751,578 | Johannesson | June 19, 1956 |
| 2,759,177 | Hightower | Aug. 14, 1956 |
| 2,885,614 | Harris | May 5, 1959 |

UNITED STATES PATENT OFFICE
CERTIFICATE OF CORRECTION

Patent No. 3,109,129                      October 29, 1963

Murray Putzer et al.

It is hereby certified that error appears in the above numbered patent requiring correction and that the said Letters Patent should read as corrected below.

Column 11, line 20, for "toin response" read -- in response --.

Signed and sealed this 28th day of April 1964.

(SEAL)
Attest:
ERNEST W. SWIDER

Attesting Officer

EDWARD J. BRENNER
Commissioner of Patents